United States Patent [19]

Munih

[11] 4,332,700
[45] Jun. 1, 1982

[54] METHOD FOR SEPARATING RUBBER FROM METAL

[75] Inventor: Pavel Munih, Kranj, Yugoslavia

[73] Assignee: SAVA KRANJ Industrija gumijevih, usnjenih in kemicnih izdelkov n.o.sol.o., Kranj, Yugoslavia

[21] Appl. No.: 199,157

[22] Filed: Oct. 21, 1980

[30] Foreign Application Priority Data

Oct. 22, 1979 [YU] Yugoslavia ............... 2565/79

[51] Int. Cl.³ .................... C08J 3/28; C08J 11/00
[52] U.S. Cl. .................... 204/155; 209/11; 260/720; 528/481; 521/45.5
[58] Field of Search ........... 260/2.3, 720; 528/481; 209/11

[56] References Cited

U.S. PATENT DOCUMENTS

| | | | |
|---|---|---|---|
| 2,223,362 | 12/1940 | Federman . | |
| 2,291,862 | 8/1942 | Bailey | 219/13 |
| 2,406,458 | 8/1946 | Gerndt et al. | 260/720 |
| 2,468,472 | 4/1949 | Townsend | 209/11 |
| 2,636,408 | 4/1953 | Mitchell | 81/9.51 |
| 2,783,213 | 2/1957 | Beau | 260/2.3 |
| 2,800,462 | 7/1957 | Sverdrup | 260/2.3 |
| 3,097,160 | 7/1963 | Rich | 209/11 |
| 3,704,108 | 11/1972 | Alpert | 260/2.3 |
| 3,725,314 | 4/1973 | Pelofsky | 260/23 |
| 3,938,266 | 2/1976 | Cook | 36/19.5 |
| 3,963,417 | 6/1976 | Placek | 432/225 |
| 3,976,563 | 8/1976 | Scalco | 260/2.3 |
| 4,055,616 | 10/1977 | Keen et al. | 264/139 |
| 4,104,205 | 8/1978 | Novotny et al. | 260/2.3 |
| 4,148,702 | 4/1979 | Lane | 204/159.12 |

FOREIGN PATENT DOCUMENTS

| | | |
|---|---|---|
| 2900655 | 7/1980 | Fed. Rep. of Germany . |
| 577830 | 6/1946 | United Kingdom . |
| 591995 | 9/1947 | United Kingdom . |

*Primary Examiner*—Wilbert J. Briggs, Sr.
*Attorney, Agent, or Firm*—Pollock, Vande Sande & Priddy

[57] ABSTRACT

A method of separating rubber from metal which includes covering a metal-containing rubber body with an inert powdered agent, exposing the body to high-frequency electromagnetic field to cause the metal to glow and the border layer of the rubber on the metal-rubber contact to be thermally degraded and carbonized, removing the powdered agent and magnetically separating the rubber from the metal, and apparatus for carrying out the method.

8 Claims, 1 Drawing Figure

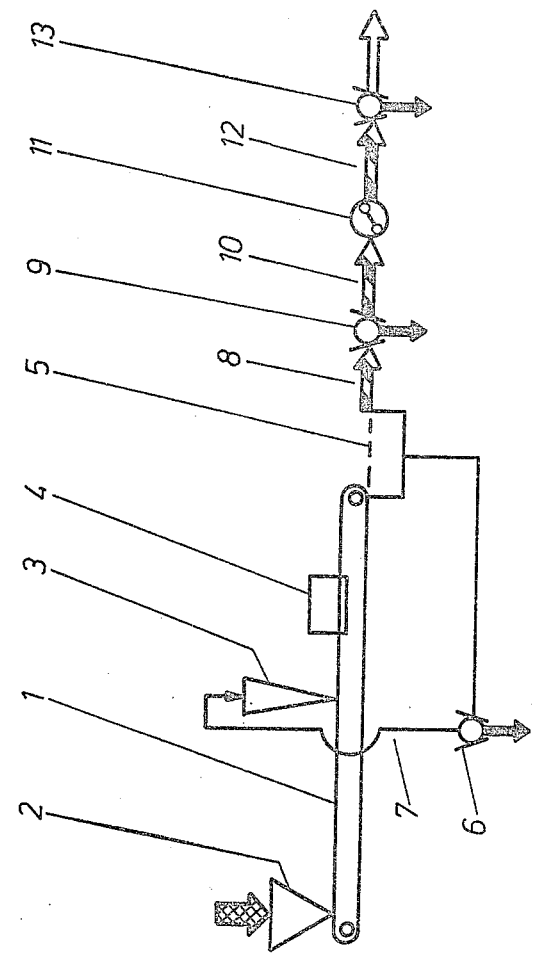

METHOD FOR SEPARATING RUBBER FROM METAL

The present invention relates to a method for separating rubber from compositions thereof with metal as well as to an arrangement for carrying out the method. This invention is preferably concerned with the processing of old and waste tires respectively comprising metal cord as a reinforcing ply incorporated in the tire.

The disposal of waste tires and similar rubber-metal combinations have for a long time represented problems from the standpoint of economy as well as environment protection.

Therefore, it has been attempted to separate said components by a simple and efficient manner without impairing either the metal or the rubber in order to make possible their reuse.

Hitherto this problem has been solved in two ways:

(a) By shredding, chopping, grinding or any other disintegration of the material and the separation thereof, e.g. by means of sifting. This yields a relatively low percentage (60%) of the pure rubber fraction, the remaining fraction being, owing to the relatively high content of bound rubber, unsuitable as secondary raw-material. The maintenance and energy costs are high.

An improvement of this method is described in DT-OS No. 26 07 945, wherein the raw materals, especially old or waste tires respectively, are separated in a preheated state, for example at a temperature of at least 100° C. Thus the strength of the metal-rubber bond is reduced to about one-third of the initial value, which results in a reduced energy consumption during the separation. However, even this method does not solve the problem satisfactorily since the separation is not complete and a part of the rubber remains bonded to the metal.

(b) By means of a severe undercooling of the raw-material converting thereby the rubber into a brittle, glassy state, followed by the grinding and separating of the components. This method is too expensive for practical use since it requires 1 kg. of liquid nitrogen as cooling medium per 1 kg. of rubber. Furthermore, a substantial part of the rubber remains bonded to the metal. For this reason the latter is not suitable as a pure secondary raw-material.

By means of the present method and the arrangement for carrying out the method there is achieved in a simple and economical way a practically complete separation of the components which are therefore suitable as secondary raw-materials.

The inventive method of the present invention is characterized in that a suitably disintegrated raw-material is covered with a layer of an inert powdered agent, e.g. pulverized talc, and exposed to the action of a high-frequency electromagnetic field, whereby the metal is heated inductively till glowing; this results in the thermic degradation of the rubber on the rubber-metal border area and in the breaking of the rubber-metal bond. The rubber is completely released from the metal and the thermally degraded surface layer bordering on the metal is carbonized owing to the lack of oxygen. The covering layer of the inert agent minimizes the ignition risk since it impedes the access of oxygen. After cooling—until the glowing of the metal ceases—the inert agent is removed, e.g. by sifting, and recycled. The rubber-metal mixture is divided into the two components by means of magnetic separation.

Provided there are metal residues adhering mechanically to the rubber, these are mechanically disjoined and recharged to the magnetic separation.

The gaseous products resulting from the thermic decomposition of the rubber on the surface of the glowing metal are drawn off and purified in known ways.

Since the rubber and other non-metallic components (e.g. textile fabric in the tires) are comparatively non-sensitive to the HF-field, the energy consumption is minimal, or depending respectively on the quantity of the metal which absorbs this energy and is heated thereby.

An arrangement of separating rubber from metal, with the aid of which the above method is executed, is schematically shown in FIG. 1. It includes a conveyer 1 at the beginning of which an appliance 2 for receiving roughly shredded parts of the raw-material, e.g. tires, is positioned. In the direction of movement of the conveyer 1 there follows a device 3 which coats, preferably by strewing, an inert powdered agent, e.g. talc, over the roughly shredded parts of tires. The conveyer 1 then passes an induction loop 4 connected to a high-frequency generator, which is not shown. In the area of this loop 4, the inductive heating of the metal parts forming the reinforcement of the tire is carried out. At the exit of the conveyer 1 a screen-like means 5 is positioned onto which the conveyer 1 deposits the already partly cooled separated components, i.e. parts of rubber and metal, mixed with the inert powdered agent. On the screen-like means 5, which is brought into vibration movement by a driving supply (not shown), small metal parts and decomposed rubber products, especially soot, together with the inert powdered agent are separated and then fed to the first magnetic separator 6 where these components are divided, whereat the inert powdered agent is fed to the device 3 over the feeding means 7 for a repeated usage.

The remaining larger parts of the metal and rubber are fed to a second magnetic separator 9 over another conveyer 8, where these metal parts are separated from the rubber parts which by now have already no adhesion to said rubber parts. From the separator 9 another conveyer 10 is leading forward, transporting all rubber parts into the disintegrator 11, that is, the parts which still have mechanically bound metal rests and also those parts from which the metal has already fallen apart and has been eliminated in the separator 9, whereat in said disintegrator 11 the remaining adhesions between the metal and the rubber are lost. With the final conveyer 12 both components are fed to the last magnetic separator 13, where the final step of separating rubber from metal is executed.

It is to be understood that outputs of all magnetic separators 6, 9 and 13 are interconnected so that all metal is collected at one place; besides, it is also obvious that the whole device is united into one unit which may contain also additional supervision and control units, which are not essential to this invention. These are primarily units for automatic matching of the speed of the conveyer 1 to the properties of the raw material as well as devices for automatic signalling and extinguishing of an eventually arising fire.

What we claim is:

1. A method for separating rubber from metal which comprises covering a disintegrated metal-containing rubber body with an inert powdered agent, exposing said rubber body to high-frequency electromagnetic field for a time sufficient to cause the metal to glow and the border layer of the rubber on the metal-rubber contact to become thermally degraded and carbonized, cooling until the metal ceases to glow, removing the inert powdered agent, and separating the rubber from the metal by means of magnetic separation.

2. The method of claim 1 wherein said metal-containing rubber body is shredded waste tire.

3. The method of claim 1 or 2 wherein said powdered agent is pulverized talc.

4. The method of claim 3 wherein said talc is recycled.

5. The method of claim 1 or 2 wherein said powdered agent is recycled.

6. The method of claim 5 wherein the powdered agent is removed by sifting.

7. The method of claim 4 wherein the talc is removed by sifting.

8. The method of claim 2 wherein said waste tire contains metal cord as reinforcing ply.

* * * * *